US007335386B2

(12) United States Patent
Plank et al.

(10) Patent No.: US 7,335,386 B2
(45) Date of Patent: Feb. 26, 2008

(54) METHOD FOR PREVENTING ACRYLAMIDE FORMATION IN FOOD PRODUCTS AND FOOD INTERMEDIATES

(75) Inventors: David W. Plank, Taylors Falls, MN (US); Daniel J. Lewandowski, Bloomington, MN (US); Douglas J. Novak, Big Lake, MN (US)

(73) Assignee: Gerneral Mills, Inc., Minneapolis, MN (US)

( * ) Notice: Subject to any disclaimer, the term of this patent is extended or adjusted under 35 U.S.C. 154(b) by 0 days.

(21) Appl. No.: 10/630,489

(22) Filed: Jul. 30, 2003

(65) Prior Publication Data

US 2005/0025875 A1 Feb. 3, 2005

(51) Int. Cl.
*A21D 6/00* (2006.01)
*A23B 4/20* (2006.01)
*A23L 3/3463* (2006.01)

(52) U.S. Cl. ...................... 426/321; 426/327

(58) Field of Classification Search ............... 426/302, 426/323, 541, 442, 466, 496, 273, 321, 327
See application file for complete search history.

(56) References Cited

U.S. PATENT DOCUMENTS

| | | | |
|---|---|---|---|
| 4,877,778 A | 10/1989 | Carpenter et al. | |
| 4,978,532 A | 12/1990 | El-Rashidy | |
| 5,063,077 A | 11/1991 | Vollbrecht et al. | |
| 5,128,161 A * | 7/1992 | Smith | 426/326 |
| 5,223,295 A | 6/1993 | Maffrand et al. | |
| 5,232,725 A | 8/1993 | Roderbourg et al. | |
| 5,342,633 A | 8/1994 | Cully et al. | |
| 5,498,437 A | 3/1996 | Kohlrausch et al. | |
| 5,624,940 A | 4/1997 | Bryant et al. | |
| 7,105,195 B2 * | 9/2006 | Plank et al. | 426/601 |
| 2003/0077361 A1 * | 4/2003 | Smail et al. | 426/94 |
| 2004/0101607 A1 * | 5/2004 | Zyzak et al. | 426/425 |
| 2004/0180129 A1 * | 9/2004 | Plank et al. | 426/637 |

FOREIGN PATENT DOCUMENTS

| | | |
|---|---|---|
| DD | 233 926 A1 | 3/1986 |
| EP | 0 284 042 | 9/1988 |
| EP | 02299562 | 12/1990 |
| GB | 2 379 152 A | 3/2003 |
| GB | 2379152 A * | 3/2003 |
| WO | WO 99/59421 | 11/1999 |
| WO | WO 99/63841 | 12/1999 |
| WO | WO 00/53637 | 9/2000 |
| WO | WO 2004/016101 A2 | 2/2004 |

OTHER PUBLICATIONS

"Baking 911" Online Jun. 20, 2001. Retrieved from internet Oct. 29, 2004. URL<http://web.archive.org/web/20010620102533/http://www.baking911.com/pies&tarts_101_page2.htm>.*
NUTRA USA "Wacker Introduces soluble dietary fiber". Published Jul. 11, 2003. Retrieved from internet Apr. 20, 2005. URL<http://www.nutraingredients-usa.com/news/ng.asp?id=25402>.*
Baking 911, filed Jun. 20, 2001, Pies & Tart Crust Basics.
XP 002290045, Yu LJ.
XP 002290046, filed Apr. 27, 1993, Kaneka Corp.
XP 002290047, filed Apr. 27, 1985, Jintan, Shokuhin.
XP 002290048, filed Feb. 1983, Takeda Chem.
XP 002290049, filed Feb. 21, 1978, Takasago Perfumery.
XP 002290050, filed Mar. 10, 1980, Lotte Co.
Mottram, et al, "Acrylamide is formed in the Maillard reaction," Nature, vol. 419, Oct. 13, 2002 (pp. 448).
"Reducing sugar," Retrieved from http://en.wikipedia.org/wiki/Reducing_sugar Apr. 2006, (1 pg).

* cited by examiner

Primary Examiner—Arthur L. Corbin
(74) Attorney, Agent, or Firm—John A. O'Toole; Douglas J. Taylor; Dale Bjorkman

(57) ABSTRACT

The present invention relates to a novel treatment composition and process for use thereof in treating food products and food intermediates to prevent acrylamide formation therein. The treatment composition may be used in single, home use settings as well as commercial applications for larger scale treatment of food products in the course of manufacture. The treatment composition of the present invention uses at least one of alpha-cyclodextrin, beta-cyclodextrin, gamma-cyclodextrin or combinations and modified derivatives thereof along with a suitable carrier such as in an aerosol, liquefied mister and the like.

15 Claims, 2 Drawing Sheets

METHOD FOR PREVENTING ACRYLAMIDE FORMATION IN FOOD PRODUCTS AND FOOD INTERMEDIATES

CROSS-REFERENCES TO RELATED APPLICATIONS

None.

FIELD OF THE INVENTION

The present invention relates to a novel treatment composition for use in treating food products and food intermediates. The treatment composition may be used in single, home use settings as well as commercial applications for larger scale treatment of food products in the course of manufacture. The treatment composition of the present invention uses at least one of alpha-cyclodextrin, beta-cyclodextrin, gamma-cyclodextrin or combinations and modified derivatives thereof along with a suitable carrier such as in an aerosol, liquefied mister and the like.

BACKGROUND OF THE INVENTION

Acrylamides have been classified as a potential carcinogen and neurotoxin that has been recently discovered to exist in varying levels in processed foods, such as fried, baked and cooked foods that are made from grain and vegetable based products such as potatoes. It has been proposed that acrylamide is formed as a result of the Maillard reaction between amino acids and reducing sugars. Asparagine, a major amino acid found in cereals (grains) and potatoes is thought to be the significant player in acrylamide production.

The Mailard reaction is responsible for producing much of the color and flavor in processed foods, such as those produced during the typical heating, cooking, frying, baking or roasting steps that accompany the production of breads, cereals, potato snacks, pastries, etc.

Asparagine has an amide group attached to a chain of two carbon atoms. The degradation of the amino acids in the presence of dicarbonyl products from the Mailard reaction causes the amino acid to become decarboxylated and deaminated to create an aldehyde. When glucose and asparagines are reacted at elevated temperatures, particularly those above 100° C., more typically above 120° C. and usually above 185° C. significant levels of acrylamides may be produced.

A focus of the present invention relates to novel uses of cyclodextrins, to reduce acrylamide levels in food products and food intermediates.

Cyclodextrins comprise a doughnut shaped or cyclical structure composed of between six to eight alpha-D-glucose units having a hydrophilic exterior (hydrophilic OH groups on the exterior rim) and a hydrophobic interior (electron dense hydrogen and oxygen atoms). Cyclodextrins are generally water soluble, free flowing crystalline powders that are substantially if not completely odorless and white in color.

Cyclodextrins are produced by the action of cyclodextrin glucosyltransferase (CGTase, EC 2.4.1.19) on hydrolysed starch syrups at neutral pH (6.0-7.0) and moderate temperature (35-40° C.). Alternatively, cyclodextrins can be produced in planta by the expression of the gene encoding CGTase in the food plant of interest.

Heretofore, starches such as cyclodextrins have not been employed or known for their beneficial reduction of acrylamide levels. Cyclodextrins have been used principally for the encapsulation of insoluble compounds on a molecular basis in order to enhance stability, reduce volatility and alter solubility as well as to increase shelf life of certain products. Such prior uses of cyclodextrins have been limited to flavor carriers and protection of sensitive substances against thermal decomposition, oxidation and degradation. In addition, more recently, cyclodextrins have also been used to remove fatty acids and cholesterol from animal fats and to remove cholesterol and cholesterol esters from egg yolks.

One potential solution to the high cholesterol problem teaches the treatment of the foodstuffs themselves with cyclodextrins rather than the consumer. U.S. Pat. Nos. 5,498,437, 5,342,633 and 5,063,077 discuss various processes for the removal of cholesterol and cholesterol esters from egg yolks, meat, animal fats, etc. It is thought that by reducing the level of cholesterol in such foodstuffs that overall levels of cholesterol may be reduced in consumers. However, processing steps to such foodstuffs increases the cost of delivering such products to market.

Another similar but apparently unrelated reference, which deals with removal of cholesterol from foodstuffs, is U.S. Pat. No. 5,232,725. This reference discusses a process for reducing cholesterol and free fatty acids in an animal fat and the material obtained from that process through the use of cyclodextrins. U.S. Pat. No. 5,223,295 also discusses the use of cyclodextrin to remove steroid based compounds from foodstuffs, particularly egg yolks. However, these patents suffer from the same drawbacks as those referenced above, in that the processing steps required to achieve the result adds another layer to delivering product to the market, causing delay and adding cost.

PCT Publications WO 99/59421 and WO 99/63841 disclose the use of phytosterols as a pharmaceutical agent or as an addition to certain foodstuffs for lowering cholesterol. The publication discusses that greater effectiveness of the phytosterols can be achieved when using a specified delivery vehicle such as a complexation with cyclodextrins. This represents little more than using cyclodextrins for a purpose that they are already known for, as a carrier for sensitive ingredients.

Another reference that teaches the use of beta-cyclodextrin as a carrier or delivery vehicle is U.S. Pat. No. 4,978,532. In this reference, dehydroepiandrosterone (DHEA) is delivered to the patient via a treatment patch. Beta-cyclodextrin is selected from a group of "permeation enhancers" to facilitate the delivery of the DHEA dose to the patient.

U.S. Pat. No. 5,624,940 the use of various complexes which include cyclodextrins for reducing bone loss and serum cholesterol levels in mammals. In this reference, the cyclodextrin, specifically hydroxypropyl-beta-cyclodextrin is used as a pharmaceutical delivery agent and not as an active ingredient useful in the reduction of serum cholesterol levels.

U.S. Pat. No. 4,877,778 discusses the administration of doses of 2-hydroxypropyl-beta-cyclodextrin at levels of up to 0.5 gm/kg per day. The cyclodextrin is used as a carrier to remove excess lipophiles from the system, specifically as set forth in the example, reduction of high vitamin A levels. With respect to serum cholesterol levels, the '778 patent suggests that the reduction of serum cholesterol levels achieved in the example is due to the system recognizing an overabundance of cholesterol and the serum cholesterol being subsequently "down-regulated. Such down-regulation is a known biologic phenomenon." The '778 patent goes on to indicate that it is "the natural cholesterol carrying system which predominates and it is the new homeostasis which must be responsible for the observed drop in serum cholesterol." Hence, the '778 patent does not suggest that the cyclodextrin is usable as a mechanism to bind bile acids or lipids to decrease reabsorption in the lower intestines and is merely cumulative of the prior art which illustrates the use of cyclodextrin as a particular pharmaceutical carrier to treat certain disorders.

Publications, patents and patent applications are referred to throughout this disclosure. All references cited herein are hereby incorporated by reference.

All percentages and ratios are calculated by weight unless otherwise indicated. All percentages and ratios are calculated based on the total composition unless otherwise stated.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Surprisingly, it has been found that through the topical addition of cyclodextrins (alpha, beta and/or gamma and/or combinations thereof) to a food product or food intermediate, the asparagine amino acid is sequestered in the hydrophobic binding pocket of the cyclodextrin and prevented from reacting with a reducing end. Alternatively, glucose or other small reducing sugars may be sequestered by the cyclodextrin preventing interaction with free asparagines. The result is lowered acrylamide levels in the product.

In one embodiment of the present invention, a food product treatment composition for reducing acrylamide levels in food products undergoing heat treatment, is described and includes a cyclodextrin selected from a group including alpha-cyclodextrin, beta-cyclodextrin, gamma-cyclodextrin or combinations and modified derivatives thereof and a carrier.

In a further embodiment of the present invention, a method of reducing acrylamide levels in heat treated food products is described and comprises the steps of; initially creating a food product or food intermediate from a grain or vegetable base or derivative, then applying a complex containing a cyclodextrin selected from a group including alpha-cyclodextrin, beta-cyclodextrin, gamma-cyclodextrin or combinations and modified derivatives thereof and a carrier; and finally, subjecting said food product or food intermediate to heating of at least 100° C.

In a still further embodiment of the present invention, a spray coating to reduce acrylamide levels in grain or vegetable based food products that are subjected heating, is described and includes a cyclodextrin selected from a group including alpha-cyclodextrin, beta-cyclodextrin, gamma-cyclodextrin or combinations and modified derivatives thereof and a carrier.

DETAILED DESCRIPTION OF THE INVENTION

Figure 1:
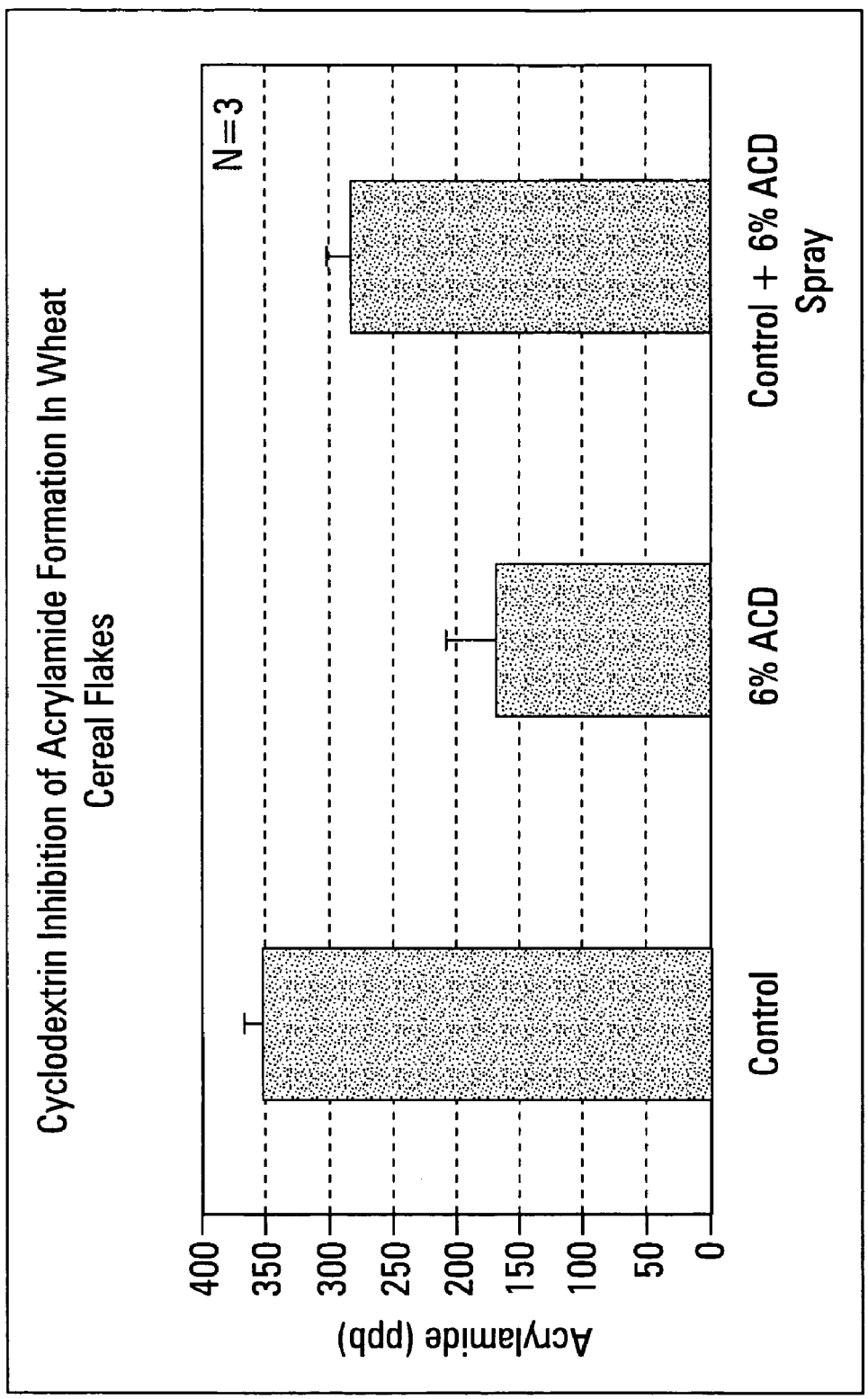
FIG. 1 is a graphical representation of results from an embodiment of the invention.

The present invention is now illustrated in greater detail by way of the following detailed description, but it should be understood that the present invention is not to be construed as being limited thereto.

As used herein a food product and food intermediate may include an additive, component, supplement or ingredient useful in preparing or supplementing a food, or a food intermediate, a fully prepared composition but in a raw state (requiring a further treatment step prior to consumption, such as baking dough to produce bread) or a finished food product that is ready to eat. Food products and food intermediates as provided hereunder generally include any food products or food intermediates derived from or containing grain, cereal or vegetable based components. Food products may also include nutritional beverages and energy drinks.

A food treatment composition includes coatings, whether by spray, aerosols, liquid or fluid curtains, mists, fogs, dripping, bath, immersion or the like that can applied topically either to a food product or a food intermediate prior to the step of cooking, drying, heating, frying, puffing or other heat treatment steps. Aerosols can be prepared in any conventional manner using known propellants. Sprays may be applied using atomizers and the like. Such coatings would be packaged in convenient to use forms such as for home or consumer use, commercial application as well as for use in retail outlets such as food service installations.

As used herein a consumable food product provided in a finished state or arising out of an intermediate and includes baked goods, muffins, rolls, cakes, pies, crackers, toaster pastries, pastries, grain based bars, granola bars, health food bars, breads, cereals, fruit snacks, fruit bars, pizza rolls, soups, pasta, yogurt, pudding, beverages, sauces, snacks, potato crisps, French fries, corn chips, tortilla chips, extruded snacks, enrobed extruded snacks, pretzels, popcorn, rice and corn cakes, fried and processed foods and generally any food products or food intermediates derived from or containing grain, cereal or vegetable based components.

Inclusion of cyclodextrin-fat complexes in consumable food products, ready to eat (RTE) cereals, mixes, doughs, grain or vegetable based foods and other food products in an amount between 0.01% to 75% by weight, preferably from 1 to 20% by weight is provided. It has been found, that the inclusion by topical application of such complexes can reduce the level of acrylamide in such food products or food intermediates.

Cyclodextrin is a product of enzymatic conversion or degradation of starch in which a cyclic ring of sugars is created containing between 5 to 1,000,000 glucose units and more typically between 6 to 8 glucose units. A principal source of cyclodextrins is maize starch. However, cyclodextrins may be derived from a wide variety of plant starches.

Cyclodextrins are produced by the action of cyclodextrin glucosyltransferase (CGTase, EC 2.4.1.19) on hydrolysed starch syrups at neutral pH (6.0-7.0) and moderate temperature (35-40° C.). Alternatively, cyclodextrins can be produced in planta by the expression of the gene encoding CGTase in the food plant of interest.

The present invention also relates to a food product in which the cyclodextrin is prepared either chemically or enzymatically from derivativses of alpha-cyclodextrin, beta-cyclodextrin, gamma-cyclodextrin and combinations thereof. In addition, the cyclodextrin used in the present invention may be formed in or on the food product by treatment with the enzyme, such as cyclodextrin glucosyltransferase (CGTase, EC 2.4.1.19) or a mutation or modification thereof.

A focus of the present invention relates to novel uses of cyclodextrins, to reduce acrylamide levels in food products and food intermediates.

Asparagine has an amide group attached to a chain of two carbon atoms. The degradation of the amino acids in the presence of dicarbonyl products from the Maillard reaction causes the amino acid to become decarboxylated and deaminated to create an aldehyde. When glucose and asparagines are reacted at elevated temperatures, particularly those above 100° C., more typically above 120° C. and usually above 185° C. significant levels of acrylamides may be produced.

While not wishing to be bound to any particular theory, it has been found that by processing a food product or food intermediate in the presence of cyclodextrins (alpha, beta and/or gamma), the asparagine is sequestered in the hydrophobic binding pocket of the cyclodextrin and prevented from reacting with a reducing end. Alternatively, glucose or other small reducing sugars may be sequestered by the cyclodextrin preventing interaction with free asparagine. The result is lowered acrylamide levels in the product as opposed to similar products that do not contain cyclodextrins.

One method of preparing cyclodextrins includes enzymatic treatment. Enzymatic degradation or treatment of the starch to produce cyclodextrins useful in the present invention is done through the use of cyclodextrin glucosyltransferase (EC 2.4.1.19) or other enzymes, which results in a cyclic ring of sugar.

The bond formed between the cyclodextrin and the amino acid asparagines is sufficiently strong so as to enable the material to pass through the system without being reabsorbed through the intestines.

The preferred starches of the present invention are cyclodextrins, preferably alpha-cyclodextrins. As indicated previously, cyclodextrins comprise a doughnut shaped or cyclical structure composed of a number of alpha-D-glucose units (typically 6-8) having a hydrophilic exterior and a hydrophobic interior. Alpha-cyclodextrin is a cyclized ring of six alpha 1,4 linked glucose units.

Cyclodextrins are generally water soluble, although alpha-cyclodextrin is likely more water soluble than beta-cyclodextrin or gamma-cyclodextrin, and free flowing crystalline powders that are substantially if not completely odorless and white in color. Heretofore, modified starches such as cyclodextrin were not employed or known for their acrylamide reducing properties via oil thickening and have been used principally for the encapsulation of insoluble compounds to enhance stability, reduce volatility and alter solubility. Such prior uses of cyclodextrins have been limited to carriers for flavors, therapeutic agents and to remove fatty acids and cholesterol from animal fats.

Alpha-cyclodextrins has a cavity dimension of about 0.50×0.79 (nm). The solubility of alpha-cyclodextrin at 25° C. is 14 (gm/100 mL). Alpha-cyclodextrin is available from Wacker Specialties, Adrian, Mich. 49221 and sold under the trademark CAVAMAX® W6 Wacker-Chemie, Burghausen, Germany.

Other cyclodextrins may be used in combination or synergistically with alpha-cyclodextrin, such as beta-cyclodextrin and gamma-cyclodextrin, in particular ratios dependent upon the requirements of the manufacturer. In an exemplary embodiment, alpha-cyclodextrin may be used individually or may be combined with between 0-50% by weight beta-cyclodextrin or gamma-cyclodextrin and more preferably between 0.1 to about 40% by weight. Beta-cyclodextrins and gamma-cyclodextrins are also available from Wacker Specialties, Adrian, Mich. 49221.

In an exemplary embodiment in the preparation of a light colored cooked cereal composition such as a cereal dough or cereal mass a cooked cereal dough can be prepared by blending various dry cereal ingredients together with water and cooking to gelatinize the starchy components and to develop a cooked flavor. A pre-blend of wet ingredients may be prepared and combined with a pre-blend of the dry ingredients. The cooked cereal material or mass can also be mechanically worked to form cooked cereal dough. The cooking and mechanical work can occur simultaneously or sequentially. The dry ingredients can also include various cooked cereal dough additives such as sugar(s), salt and mineral salts, and starches. In addition to water, various liquid ingredients such as malt syrups can be added. A cooked cereal mash is quite similar to cooked cereal dough except that larger sized particles such as whole grains or cut grains are cooked rather than cereal flour ingredients.

While the invention finds particular suitability for use in connection with the provision of ready to eat ("R-T-E") cereals fabricated from cooked cereal doughs, the skilled artisan will appreciate that the present cooked cereal doughs can find applicability for use in connection with other grain based food products such as grain and vegetable based snack products. For example, the cooked cereal doughs can be formed into suitably sized, shaped and partially dried pellets or intermediates. These intermediates are useful in forming finished products. Finished grain or vegetable based snack products are usually provided by the deep fat frying or other puffing of the pellets (e.g., hot air or microwave heating) of partially dried intermediate products fabricated from cooked cereal doughs.

An advantage of producing intermediates is that they can be produced in bulk in one location and thereafter fried in one or more finish operations to form the finished snack products. Not only are shipping costs reduced due to the reduced volume of the intermediates compared to the finished products but also breakage of the finished product is reduced.

The cereal dough cooking step can be practiced using a batch, atmospheric cooker and a low pressure extruder cooker especially those equipped with a conditioner pre-cooker, or a twin screw extruder. The cereal dough is cooked with steam and sufficient amounts of added water for times and at temperatures sufficient to gelatinize the cereal starch and to develop desired levels of cooked cereal flavor.

The present exemplary method, for purposes of illustration, comprises the step of forming the cooked cereal dough or mass into individual pieces of a predetermined, desirable shape and size and having a particular moisture content. Conventional techniques and equipment can be employed to practice this step and the skilled artisan will have no difficulty in selecting those suitable for use herein.

For example, the dough having a moisture content of about 25% to 30% is first partially dried to a partially dried dough having a moisture content of about 12% to 20%. The partially dried dough can then be fed to piece forming apparatus that form the partially dried dough into individually shaped and sized pieces.

The present cereal compositions can be fabricated into any of a variety of common R-T-E cereal or snack forms including, shreds, biscuits, flakes, rings, or any common R-T-E cereal or cereal based snack product form, shape or size.

The present cereal compositions can also be formulated and fabricated so as to provide puffed cereals of various shapes and sizes such as "biscuits". Especially desirable for use herein are biscuits, especially toasted biscuits. Especially for flakes, the forming step can first involve a sub-step of shaping the dough into pellets and then a finish step of shaping the pellets into a final desired shape such as flakes.

The cooked cereal dough can be fed to a pellet former to form pellets. In the preparation of R-T-E cereals in flake form, for example, the pellets can be sized to have a pellet count of about 35 to 50 per 10 g and a moisture content of 16 to 20%. In the preparation of a flaked R-T-E cereal, the pellets can be partially dried to moisture contents of about 18 to 20%. The pellets can then be formed into "wet" flakes having a thickness of about 380 to 635 μm (0.015 to 0.025 inch), preferably while warm 76.6 to 87.8° C. (170 to 190° F.) to form desirably shaped and sized wet flakes.

The dough can also be sheeted to form sheets of dough (e.g., 25 to 800 microns in thickness) and the individual pieces formed by cutting the sheet into individual pieces or by stamping out shaped pieces from the dough sheet.

The cooked cereal dough may also be extruded through a die imparting a desired peripheral shape to form an extrudate cooked cereal dough rope. The dough rope can be cut to form individual shaped pieces. In another variation, the cooked cereal dough is formed into individual "O" shaped pieces or rings, biscuits, shreds, figurines, letters, spheres or flakes or other geometric shapes, nuggets, or even irregular shapes.

Next, the shaped and sized individual pieces are dried to form finished cereal products. The skilled artisan will appreciate that the drying step depends importantly in part upon the desired end product. For example, for end products in the form of puffable intermediates or pellets for snack production, the drying step can be practiced to provide a "finish" moisture content of about 10 to 15%. However, when the desired end product is an R-T-E cereal, drying the pellets to these moisture contents may only be an intermediate or sub-step prior to, for example, flaking the dried pellets to form "wet" flakes. These "wet" flakes can then be subjected to a finish or final drying step wherein the pieces are dried to final dried moisture contents of 1 to 4% such as by toasting.

In another variation, the dough can be extruded under conditions of temperature and pressure so as to puff and expand (the "direct expansion" technique) and sectioned or cut into individual pieces to form individual expansions puffed R-T-E cereal or snack pieces. The cooked cereal dough can be puffable such as by deep fat frying, microwave heating, gun puffing, jet zone heating, etc. to prepare snack products.

The drying step can also involve heating the pieces under conditions that not only dry the piece but also cause the piece to expand to form dried and puffed or flaked finished pieces. For example, pellets can be gun puffed to form dried puffed R-T-E cereal products. The wet flakes can be toasted to dry, expand and tenderize to form finished R-T-E cereal flakes.

The pieces or pellets may also be deep fat fried to form dried puffed fried finished cereal products. Such dried puffed fried finished cereal pieces are especially desirable as snack products. Such products can absorb about 5 to 35% of frying fat during the drying and puffing step.

As indicated previously, the step of drying, toasting, heating, cooking, frying or other steps of imparting heat to the product results in the grain or vegetable based product developing its flavor and color attributable to the end product, i.e. the Maillard reaction. The degradation of the amino acids, asparagines, in the presence of dicarbonyl products from the Maillard reaction causes the amino acid to become decarboxylated and deaminated to create an aldehyde. When glucose and asparagines are reacted at elevated temperatures, particularly those above 100° C., more typically above 120° C. and usually above 185° C. significant levels of acrylamides may be produced.

It has been surprisingly found that the dried, toasted, fried pieces, can be provided with a topical coating of alpha-cyclodextrin, beta-cyclodextrin, gamma-cyclodextrin or combinations and modified derivatives thereof to reduce the acrylamide levels of the resulting food product when compared with food products produced above without the additional topical or spray coating. If necessary, the product may be further dried to remove the moisture added by the coating solution.

In other embodiments, an oil or shortening based topical coating containing alpha-cyclodextrin, beta-cyclodextrin, gamma-cyclodextrin or combinations and modified derivatives thereof optionally with salt and/or flavors, may applied to form finished dried snack products. In an exemplary embodiment of the present invention, a fat product, in this case a shortening, may be formulated. In this example, samples were prepared using about 5 to 20% of alpha-cyclodextrin by weight of the product.

| Shortening | |
| --- | --- |
| Ingredient | Weight Percentage |
| Oil* | 70% |
| Water | 13% |
| Alpha-cyclodextrin | 10% |
| Emulsifier** | 7% |

*Oil may be composed of, but not limited to: soybean oil, high-oleic sunflower oil, high-linoleic soybean oil, palm oil, palm kernel oil or coconut oil.
**Emulsifier may be composed of but not limited to: fully hydrogenated soybean oil mono-, di-, or tri-glyceride; mono-, di-, or tri-stearate.

This example was prepared by first hydrating the cyclodextrin in the water. The cyclodextrin-water mixture was added slowly to the oil-emulsifier mixture with constant stirring. The complete mixture is allowed to continue to stir for an additional 10 to 30 minutes to allow complete thickening of the shortening product.

The topical coating is applied in sufficient amounts such that after drying, if necessary, to remove added moisture associated with the coating solution, the coating is present in a weight ratio of coating to cereal base of about 1:100 to about 50:100, preferably 10:100 to about 40:100 and for best results about 25:100 to about 35:100.

Typically, the coating solution will have a blend of cyclodextrin and water and will comprise about 4 to 20% moisture. When higher amounts of the coating solution, particularly for those solutions employing higher moisture levels, the slurry coated cereal pieces may be subjected to a final drying step to remove the added moisture from the coating to provide finished dried products having a moisture content of about 1 to 5%.

The R-T-E cereal pieces, snack products or the like, so prepared can then be conventionally packaged for distribution and sale.

Acrylamide was measured in food products using the following methodology:

Reagents and Consumables

Acrylamide (Sigma Chemical Company, St. Louis, Mo.)

$^{13}C_3$-labeled acrylamide (Cambridge Isotope Laboratory, Andover, Mass.)

HPLC grade acetonitrile (Omnisolv, EM Science, Gibbstown, N.J.)

HPLC grade methanol (Omnisolv, EM Science, Gibbstown, N.J.)
HPLC grade 2-propanol (Omnisolv, EM Science, Gibbstown, N.J.)
HPLC grade water (Omnisolv, EM Science, Gibbstown, N.J.)
Formic acid 99% (Sigma Chemical Company, St. Louis, Mo.)
Glacial acetic acid 99% (Sigma Chemical Company, St. Louis, Mo.)
Maxi-Spin filter tube, 0.45 μm PVDF (Alltech Associates, Deerfield, Ill.)
50 mL polypropylene conical tube with cap (Becton Dickinson)
Hydro-RP 80A HPLC column (2×250 mm), 4 micron packing (Phenomonex, Torrance, Calif.). Wash column a minimum of 20 min with 50:50 methanol:acetonitrile after 48 samples or at end of daily operations. Mobile phase re-equilibration for analyses will require 1.5 hr.
OASIS HLB 6 mL solid phase extraction cartridge, 200 milligram packing (Waters Corporation, Milford, Mass.).
Bond Elut—Accucat (mixed mode, C8, SAX and SCX) 3 mL solid phase extraction cartridge, 200 milligram packing (Varian Inc., Harbor City, Calif.).
Instrumentation
Agilent (Palo Alto, Calif.) Model 1100 autosampler, binary HPLC pump and column heater
Micromass Inc. (Manchester, UK), Quattro micro triple quadrupole mass spectrometer
Sample Preparation
1. Crush and homogenize a portion of sample equal to the manufacturer's recommended serving size with a food processor or equivalent device.
2. Weigh a one gram portion of crushed sample into a 50 mL polypropylene graduated conical tube with cap.
3. Add 1 mL of internal standard solution ($^{13}C_3$-labeled acrylamide in 0.1% formic acid, 200 ng/mL), followed by 9 mL of water to the test portion. Shake by hand or vortex briefly to disperse test portion in water prior to step 4.
4. Mix for 20 minutes on a rotating shaker. (MN: Do not heat or sonicate, as this may generate an extract that will clog the SPE column.)
5. Centrifuge at 9000 rpm for 15 min. Promptly remove 5 mL portion of clarified aqueous phase for spin filtration and SPE. Avoid top oil layer and bottom solids layer when removing portion of aqueous phase.
6. Place 5 mL portion in Maxi-Spin filter tube, 0.45 μm PVDF (Alltech #2534). Centrifuge at 9000 rpm for 2-4 min. If filter clogs, insert new filter into tube, pour unfiltered liquid onto new filter and continue centrifugation until most of the liquid has passed through filter.
7. Condition OASIS SPE cartridge with 3.5 mL methanol, followed by 3.5 mL of water. Discard methanol and water portions used to prepare cartridge. A number of SPE cartridges were tested during development of this method, and all of them had different analyte retention and elution characteristics. Do not substitute another SPE sorbent in this step without testing.
8. Load OASIS SPE cartridge with 1.5 mL of the 5 mL test portion extract. Allow extract to pass completely through the sorbent material. Elute column with 0.5 water and discard. Elute column with additional 1.5 mL water and collect for Varian SPE cartridge cleanup. Do not use a vacuum to speed-up the elution process in any of the SPE steps.
9. Place mark on outside of Varian SPE cartridge at height of 1 mL liquid above sorbent bed. Condition Varian SPE cartridge with 2.5 mL methanol, followed by 2.5 ml of water. Discard methanol and water portions used to prepare cartridge. Load 1.5 mL portion collected in step 8 and elute to 1 mL mark before collecting remainder of eluted portion. Transfer to 2 mL autosampler vial for LC/MS/MS analysis. This step removes a number of early eluting co-extractives, resulting in better precision for sub-50 ppb measurements. Do not load more than 1.5 mL of extract onto Varian SPE cartridge.

Liquid Chromatography/Mass Spectrometry:
1. Mobile phase composition: Aqueous 0.1% acetic acid, 0.5% methanol
2. Column flow rate: 200 μL/min
3. Post-column makeup flow rate: 50 μL/min 1% acetic acid in 2-propanol
3. Injection volume: 20 μl
4. Column temperature: 26° C.
5. Acrylamide elution time: approximately 7.1 minutes
6. Ionization Mode: Positive ion electrospray
8. Probe temperature: 240° C.
9. Source temperature: 120° C.
10. Desolvation gas flow: 710 L/hr nitrogen
11. Cone Gas flow: 153 L/hr nitrogen
12. Collision gas pressure: 1 Torr argon
13. MRM ions: Acrylamide (m/z 72, 55, 27), Internal Standard (75, 58, 29). Collision energy of transitions for MRM: 72>72 and 75>75, 5 volts; 72>55 and 75>58, 10 volts; 72>27 and 75>29, 19 volts. Dwell time 0.3 sec each with 0.02 sec inter-channel and inter-scan delay.
14. Quantitation: Parts per billion acrylamide=(200 ng internal standard)(area of m/z 55)/(area of m/z 58)(g of portion analyzed)(response factor). The response factor is the average response factor obtained from a concurrently run standard curve encompassing the range of apparent acrylamide levels in the test portions. Limit of quantitation is defined as the level at which a 10:1 signal/noise ratio is observed for the analyte quantitation ion (m/z 55).

Wheat flakes, such as WHEATIES® available from General Mills, Inc. Minneapolis, Minn. 55426, were prepared in accordance with the foregoing process with the following results depicted in FIG. 1. The results were obtained through the use of a cyclodextrin-oil spray.

Figure 2:
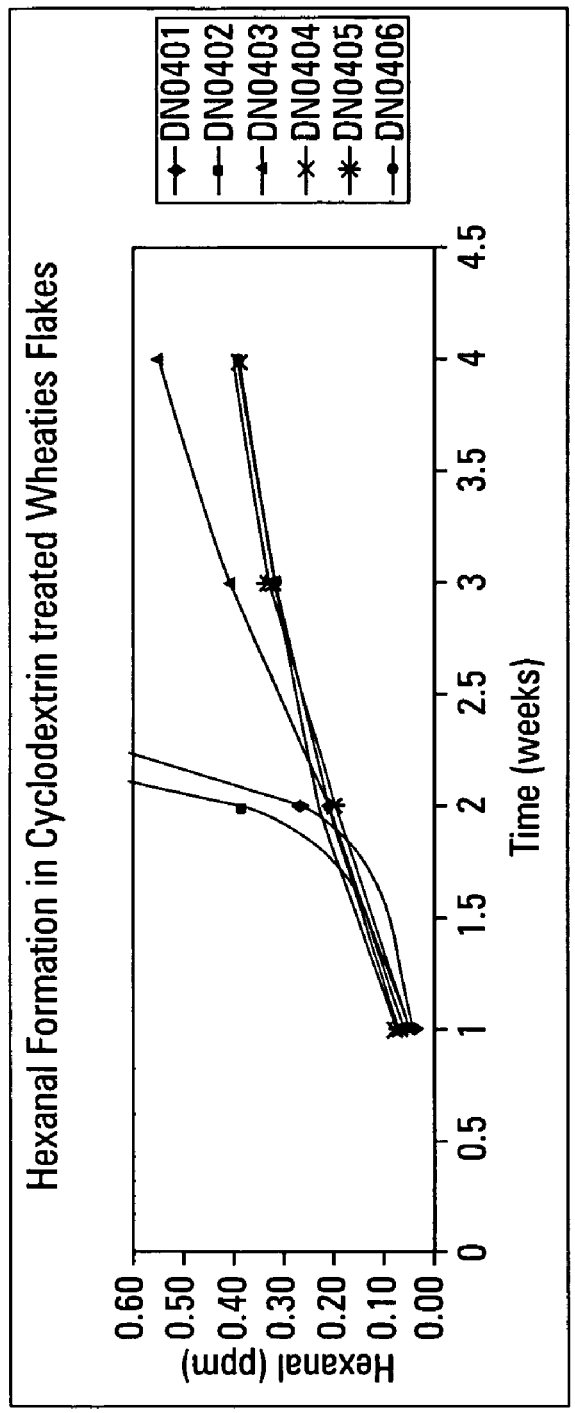
FIG. 2 is a table of data and a graphical representation of results from a further embodiment of the invention.

The table and graph provided in FIG. 2 presents results of the cyclodextrin spray using a hexanal formulation in connection with Wheat flakes, such as WHEATIES® available from General Mills, Inc. Minneapolis, Minn. 55426.

In another exemplary embodiment a dough mixture used in forming a dough intermediate such as for use in forming a biscuit, roll, bun or the like was prepared in accordance with the following. The formula is intended to be illustrative only and not limiting in scope of the present invention. Exemplary products are sold under the trademark GRANDS® available from General Mills, Inc. Minneapolis, Minn. 55426.

| Ingredient | Weight Percentage |
|---|---|
| Flour | 51.8 |
| Water | 23.98 |
| Sugar | 4.03 |
| Corn Syrup | 3.73 |

-continued

| Ingredient | Weight Percentage |
| --- | --- |
| Dextrose | 3.51 |
| Yeast | 2.09 |
| Glycerol | 1.86 |
| Shortening | 1.84 |
| Egg Solids | 1.77 |
| Whey | 1.49 |
| Soda | 0.80 |
| Salt | 0.75 |
| SAPP | 0.55 |
| Mono&DI Glycerides | 0.50 |
| Dough Conditioners | 0.50 |
| Flavor | 0.41 |
| SALP | 0.40 |
| Total | 100 |

As used herein SAPP refers to sodium aluminum pyrophosphates, which is a fast acting chemical leavening agent. SALP refers to sodium aluminum phosphate which is slow acting chemical agent. However, other chemical leavening agents may also be used such as DCP—dicalcium phosphate, MCP—monocalcium phosphate monohydrate, SAS—sodium aluminum sulfate, potassium hydrogen tartrate—cream of tartar, combinations and the like.

The flour is preferably a wheat-based flour, but other flour types such as barley, rice, corn, potato and soy flour may also be used in this invention.

Other components for dough that are useable in the present invention include, for example fat or shortening in an amount from 1 to 20% by weight, egg solids in an amount of from about 0.01% to about 25%, milk replacer, milk solids or whey in an amount of from about 0.1% to about 12%, sugar in an amount from about 1% to about 25%, yeast in an amount of from about 1.0% to about 7% and water in an amount from about 40% to about 80%. The forgoing percentages are based on weight of the mixture.

The dough was prepared by adding the ingredients to a mixer, where it was mixed on low speed for approximately one minute, until a dough ball was formed and then on medium to high speed for approximately eight minutes.

The dough was then removed from the mixture and then sheeted or rolled out and cut into strips. The ends of the strips were moistened with water to form a sealing end for the product. A filling layer, such as cinnamon, fruit filling, cheese, etc. may be deposited onto the dough strips and either encased in the dough or the dough layers simply wrapped on themselves. The dough was then rolled onto itself to form the desired number of rolls, layers or swirls and then the roll is cut into roughly one inch slices to form the dough intermediate.

The dough intermediates may then be sprayed with a cyclodextrin-water complex or cyclodextrin-oil complex, for instance a butter flavored oil to add additional taste to the intermediate and then partially baked ("par-baked"). Alternatively, the intermediates may be stored in a refrigerated or frozen state prior to use and then the cyclodextrin-water complex or cyclodextrin-oil complex applied prior to baking to inhibit the formation of acrylamide.

In a still further example of the present invention potato snacks such as French fries, potato crisps and the like were prepared in a conventional manner and sprayed with a cyclodextrin-water complex or cyclodextrin-oil complex.

In an exemplary embodiment, Russet potatoes were peeled, cut into roughly quarter inch strips and immersed and blanched in hot water for 5-6 minutes at about 165° F. Next, the potato strips were briefly immersed in an aqueous solution comprising containing about 3% salt and 0.2% SAPP based on total weight of water which was held at a temperature of about 160° F. The potato strips were removed and drained and then dried for about 2-4 minutes in a conventional forced air oven dryer at about 170° F.

In a still further exemplary embodiment of the present invention, the potato pieces prepared in accordance with the following:

| Ingredient | Percentage | Weight |
| --- | --- | --- |
| Potato | 80% | 3995.2/gm |
| Water | 16.2% | 809.02/gm |
| Salt | 1.5% | 74.91/gm |
| Dent Corn Starch | 0.4% | 19.98/gm |
| Alpha Cyclodextrin | 1.9% | 94.9/gm |
| Total | 100% | |

Each of the ingredients for the exemplary formulation were initially measured out and were added to the water and the solution mixed. In the above example, the mixture will be referred to as the marinade.

A dent corn starch, such as Melojel is a amylose containing food grade starch, derived from corn (approximately 25% amylose) and is available from National Starch of Bridgewater, N.J. The alpha-cyclodextrin is available from Wacker Specialties, Adrian, Mich. 49221 and sold under the trademark CAVAMAX® Wacker-Chemie, Burghausen, Germany.

The salts used herein may be sodium chloride, potassium chloride or mixtures thereof.

The potato pieces are then placed in a tumbler and the marinade added. A vacuum is pulled to a minimum of 22 to about 30 inches with about 25 to 30 inches being preferred. The potato/marinade combination is then tumbled for approximately 30 minutes. After the tumbling periods were complete, the contents of the vessel were emptied and placed in a cooler. The tumbling or marinating time period can range from about 15 minutes to around an hour. Tumbling the marinade and potato under a vacuum, causes the potato/starch complex to act as a sponge thereby permitting the potato to become infused with the marinade.

In other embodiments, the present invention is also useful in treating food products that are provided or sold in an intermediate state so as to be able to reduce acrylamide levels of products that consumers purchase in a par-baked or par-fried condition, that is not fully prepared, and undergo a final baking, frying or cooking in the consumer's home or in a commercial setting such as in a restaurant, cafeteria, etc. That is, the products that are partially prepared or in an intermediate step do not exhibit an elevated level of acrylamide as they have not undergone the final heat treatment step such as cooking or baking. Nonetheless, to inhibit or reduce the amount of acrylamide that may be present in such foods, although at the intermediate step, a cyclodextrin-water complex or cyclodextrin-oil complex is applied to the food product through the use of a sprayer, dipping, coating or other convenient means for home, restaurant, cafeteria or other food service application. Examples of such products that are provided to an end user in an partially baked condition include taco shells, piecrusts, breakfast pastries, biscuits, rolls, bread products, baked goods, French fries, snacks and the like.

It will thus be seen according to the present invention a highly advantageous food treatment composition has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. A method of prevention of formation of acrylamide in heat treated food products comprising the steps of;
   a) providing a food product or food intermediate from a grain or vegetable base or derivative thereof in need of prevention of formation of acrylamide during heating;
   b) applying a composition containing a cyclodextrin, selected from the group consisting of alpha-cyclodextrin, beta-cyclodextrin, gamma-cyclodextrin, combinations thereof and modified derivatives thereof, and a carrier topically to said food product or food intermediate in an amount effective to prevent formation of acrylamide during heating; and
   c) subjecting said food product or food intermediate to heating of at least 100° C.

2. A method as recited in claim 1, including a further step of partially baking said food product or food intermediate prior to the step of heating the food product or food intermediate to at least 100° C.

3. A method as recited in claim 1, wherein the step of applying the composition is accomplished by spraying.

4. A method as recited in claim 1, wherein said food product or food intermediate is selected from a group including baked goods, muffins, rolls, cakes, pies, crackers, toaster pastries, pastries, grain based bars, granola bars, health food bars, breads, cereals, fruit snacks, fruit bars, pizza rolls, soups, pasta, yogurt, pudding, beverages, sauces, snacks, potato crisps, French fries, corn chips, tortilla chips, extruded snacks, enrobed extruded snacks, pretzels, popcorn, rice and corn cakes, fried and processed foods.

5. A method as recited in claim 1, wherein said food product or food intermediate is partially baked before having the composition applied thereto.

6. A method as recited in claim 1, wherein said cyclodextrin is alpha-cyclodextrin.

7. A method as recited in claim 1, wherein said composition comprises about 5% to 20% alpha-cyclodextrin by weight of the composition.

8. A method as recited in claim 1, wherein said cyclodextrin is aipha-cyclodextrin in combination with from 0-50% by weight beta-cyclodextrin or gamma-cyclodextrin.

9. A method as recited in claim 1, wherein said cyclodextrin is alpha-cyclodextrin in combination with from 0.1-40% by weight beta-cyclodextrin or gamma-cyclodextrin.

10. A method as recited in claim 1, wherein the application of said composition to said food product or food intermediate comprises applying the composition by exposing the food product or food intermediate to said composition in the form selected from a group consisting of an aerosol, curtain, fog or mist.

11. A method as recited in claim 1, wherein the application of said composition to said food product or food intermediate comprises applying the composition by a bath or immersion process step.

12. A method as recited in claim 1, wherein said carrier is selected from a group consisting of water, oil and combinations thereof.

13. A method as recited in claim 1, wherein after the subjecting of said food product or food intermediate to heating of at least 100° C., said food product or food intermediate is provided in a fresh, unrefrigerated state.

14. A method as recited in claim 1, wherein after said subjecting of said food product or food intermediate to heating of at least 100° C., said food product or food intermediate is provided in a refrigerated state.

15. A method as recited in claim 1, wherein after said subjecting of said food product or food intermediate to heating of at least 100° C., said food product or food intermediate is provided in a frozen state.

* * * * *